(12) United States Patent
Kauzlarich

(10) Patent No.: US 7,110,921 B1
(45) Date of Patent: Sep. 19, 2006

(54) METHOD FOR DESIGNING A PROFILE DIE FOR POLYMER EXTRUSION

(76) Inventor: James J. Kauzlarich, 1603 Inglewood Dr., Charlottesville, VA (US) 22901

(*) Notice: Subject to any disclaimer, the term of this patent is extended or adjusted under 35 U.S.C. 154(b) by 943 days.

(21) Appl. No.: 09/922,250

(22) Filed: Aug. 6, 2001

Related U.S. Application Data

(60) Provisional application No. 60/223,773, filed on Aug. 8, 2000.

(51) Int. Cl.
*B28B 3/20* (2006.01)
*B29C 45/00* (2006.01)
*G06F 17/50* (2006.01)

(52) U.S. Cl. .................. 703/1; 264/176.1; 264/514
(58) Field of Classification Search .............. 703/1; 264/176.1, 514
See application file for complete search history.

(56) References Cited

U.S. PATENT DOCUMENTS

| 5,090,464 | A |  | 2/1992 | Kauzlarich et al. ......... 152/310 |
| 5,608,637 | A |  | 3/1997 | Wang |
| 5,926,393 | A |  | 7/1999 | Wang ......................... 364/488 |
| 5,974,850 | A |  | 11/1999 | Huang .......................... 72/271 |
| 6,004,489 | A | * | 12/1999 | Huang et al. .............. 264/40.1 |
| 6,161,056 | A | * | 12/2000 | Sato ........................... 700/193 |
| 6,246,918 | B1 |  | 6/2001 | Wang .......................... 700/97 |

* cited by examiner

*Primary Examiner*—Hugh Jones
(74) *Attorney, Agent, or Firm*—George F. Helfrich

(57) ABSTRACT

A method for designing a profile extrusion die is based on an analogy that exists between membrane deflection under pressure and low Reynolds number pressure driven fluid flow. The analogy is used to predict the relative shape of the die to correct for die swell or die contraction. The application of the analogy takes into consideration the characteristics of the extruder, the operating conditions, and the extrudate composition.

5 Claims, 6 Drawing Sheets

METHOD FOR DESIGNING A PROFILE DIE FOR POLYMER EXTRUSION

This application claims the benefit of U.S. Provisional Application No. 60/223,773, filed Aug. 8, 2000, and entitled "Die Design for Plastics Extrusion."

BACKGROUND OF THE INVENTION

1. Field of the Invention

The present invention relates generally to profile extrusion die hardware. It relates particularly to a method for designing a profile die for polymer extrusion.

2. Description of the Related Art

Extrusion is the process of forcing material through a die having an extrusion profile, to form a product having a cross section that matches the extrusion profile. The length of the extruded product is determined by the amount of material forced through the die. The cross section of the extruded product is determined by the shape of the profile, which is defined by the die designer.

The design of flat plate dies (also called profile or orifice dies) is affected by many variables, including the composition of the viscoelastic extrudate, as well as the operating parameters of the extruder machine. For low Reynolds Number flows of viscoelastic polymers, the resulting extrudate can swell or shrink anywhere from 10% to 300% depending upon the die shape, material composition, extruder screw speed, temperature, etc. Chris Rauwendaal states in *Polymer Extrusion* (published by Hanser, New York, 1986), "A good die designer must anticipate the amount of uneven swelling, and design the flow channel accordingly. This process is a very difficult task and the determination of the flow channel geometry is often done by a 'trial and error' process. Determination of the proper flow channel geometry to minimize uneven swelling by engineering calculations is generally not practical."

The objective of the subject invention is to present a new method for designing profile extrusion dies. The method is based on an analogy that exists between membrane deflection under pressure and low Reynolds Number pressure driven fluid flow die swell. Sir Horace Lamb (*Hydrodynamics*, Dover, New York, 1932) comments on an analogy between the theory of the steady motion of a viscous liquid in two dimensions and that of the flexure of an elastic plate. However, in spite of the fact that this analogy was recognized many years ago, and designing profile dies for extrusion of rubber and other materials has been a problem for even longer, to date no one in the art has recognized that this analogy might beneficially be applied to polymer extrusion dies where swelling or contraction is a problem.

Die designers typically use experience-based rules to derive profile extrusion die designs. After designing an initial profile extrusion die, the design is implemented in a trial extrusion process. The designer evaluates the resulting extrusion to determine whether the die design produced the desired result. If not, then the die dimensions are modified and tested in another extrusion process. Often, many iterations of modifying and testing the die are necessary before arriving at a design that yields the desired result. This current methodology is time-consuming and requires a great deal of experience-based judgement and die modification. In addition, the designer must modify the die and re-initiate the process every time product dimension requirements change, or when a new material is to be extruded. Much of the problem is caused by the fact that the extruded material stores energy while under pressure, and then swells as it exits the die. The expansion of the extrudate is generally unpredictable for complex profile geometries, and may vary from 10% for some polymers to 100% for some rubber materials. Consequently, extrusion die design is often slow and costly, and designers resist the introduction of new materials to the profile extrusion market.

It would be of great benefit to the extrusion industry to provide a method which would decrease much of the iterative guesswork and reliance on experience currently required by the die design process. Die designers would prefer for profile die design to be less of an art, and more of a science. To that end, there have been some significant developments in the past few years, but nothing that has fully solved the iterative design problem, and nothing of the nature of the subject invention.

Recent inventions by Wang et al and Huang, et. al., particularly have attempted to address this problem. Patents by Wang (U.S. Pat. Nos. 5,608,637, 5,926,393, and 6,246,918) describe methods by which a slit die is used to determine properties of particular polymer resins, information sheets are derived from the acquired properties, the information is stored in a computer, and the data is used to design a profile die. Patents by Huang (U.S. Pat. Nos. 5,974,850 and 6,153,131) describe the design of pockets in thick dies to increase extrusion speed, and the development of extrusion processes for existing profiles, given the properties of the resin to be extruded. To date, no inventions successfully address the problem of designing an extrusion profile based on polymer properties and desired product dimensions, such that die swell for complex profile shapes can be effectively predicted.

BRIEF SUMMARY OF THE INVENTION

Accordingly, it is an object of the present invention to provide a method that enables a designer to readily design a profile extrusion die for extruding polymers, given the desired cross sectional dimensions of the extruded product, and given the properties of the material to be extruded.

Another object of the invention is to provide a method for designing a profile extrusion die that reduces work, cost, and cycle time from tooling design to the market place.

Yet another object of the invention is to provide a method for designing a profile extrusion die that reduces the level of experience required of the designer.

Other objects and advantages of the present invention will become apparent from the following detailed description of the invention, taken in conjunction with the accompanying drawings, theory, and incorporated material.

The present invention is a method that accomplishes the preceding objects. A new method is presented for designing a profile extrusion die. The method is based on an analogy that exists between membrane deflection under pressure and low Reynolds number pressure driven fluid flow. The analogy is used to predict the required shape of the die to correct for die swell or die contraction. The application of the analogy takes into consideration the characteristics of the extruder, the operating conditions, and the extrudate composition.

In the preferred embodiment of the invention, a rubber membrane is modeled using finite element analysis software. A simulated pressure is applied to the rubber membrane, and edge deflections are measured and compared to the edge positions of the unpressurized membrane. Using the mathematical comparison between the pressurized and unpressurized membrane edges, along with known behavioral properties from previous extrusions, a multiplicative correction factor is calculated and applied to the edge deflections of the pressurized membrane model. The corrected edge deflections define the geometry for a die profile which allows for the predicted die swell or die contraction.

DETAILED DESCRIPTION OF THE INVENTION

Figure 1:
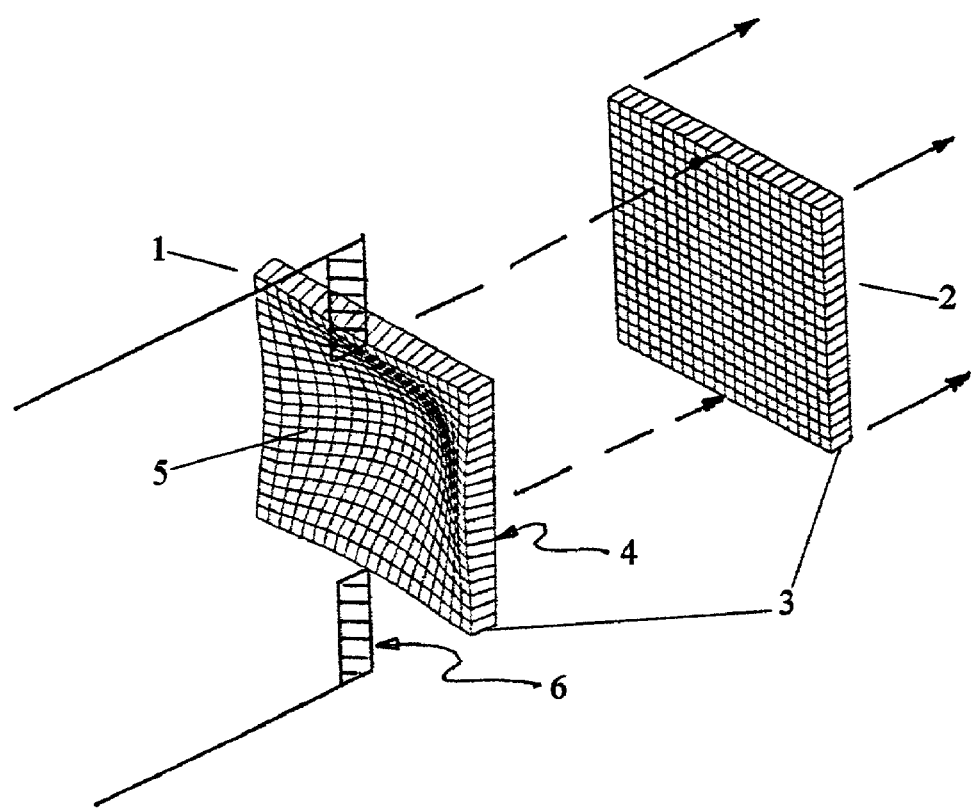
FIG. 1 is a schematic diagram illustrating both an example of behavior of an extruded polymer as it exits a die, and the difference in geometry between one embodiment of a pressurized and unpressurized finite element plate model.

The present invention is a method for designing a profile extrusion die. The method relies upon an analogy between membrane deflection under pressure and low Reynolds Number pressure driven fluid flow, taking into consideration the characteristics of the extruder, the operating conditions, and the extrudate composition. The analogy is used to predict the shape of the die profile required to produce an extruded product with the desired cross sectional dimensions, correcting for die swell or contraction of the extruded polymer.

The preferred embodiment of the invention is a process comprising six steps, which are as follows:
1. Obtain the cross-sectional profile geometry for the desired extrusion.
2. Using a suitable finite element software program, define a plate model with the required cross-sectional dimensions, a thickness of about ten percent of the major cross-sectional diameter, and typical mechanical properties for a rubber material.
3. Using the finite element program, constrain the modeled plate at the external and any internal edges by pinning, and apply a uniform pressure to one (upstream) side of the plate, sufficient to deflect the plate no more than the thickness of the plate material.
4. Measure the deflection of the edges of the plate model.
5. Calculate a multiplication factor to be applied to the edge deflections, based on the major diameter of the plate, and on historical data for the particular extrusion machine and extrudate material.
6. Apply the multiplication factor to the deflections of the edges of the pressurized plate, to determine the amount of die-swell or contraction for the entire profile.

The profile geometry (i.e. cross-sectional shape) for the desired extrusion can be obtained from the consumer, customer, product designer, or other person who desires a new product of the specified dimensions. A suitable finite element software program for defining the plate model is "CDA Sprint II," which may be obtained by contacting The CDA Group, Rt. 3, Box 158, Floydada, Tex. 79235, although other similar software may be just as appropriate.

When the dimensions of the profile have been inputted to the finite element program, the properties of a typical rubber may be selected for the plate. The software program should require selection of a modulus of elasticity (E), and the Poisson's ratio (v) for the material. Suitable variables for a rubber material are E=2 Mpa and v=0.49, typical properties for rubber. The subject invention relies on a novel recognition of the analogy between the bending behavior of a membrane under pressure, and the fluid flow velocity of the extruded material through a profile of the same shape. The analogy requires that the membrane behave similarly to a soap film with insignificant bending strength, therefore the properties for a thin rubber membrane are appropriate. Typically for rubber materials, a thickness of about ten percent of the major cross-sectional dimension of the plate will provide appropriate bending behavior, although other suitable rubber-like and polymeric materials may be envisioned, for which differing thicknesses might be more appropriate.

The plate must be constrained sufficiently to allow it to be pressurized while maintaining its relative position, and to simulate the analogous fluid flow conditions. Therefore a number of external edge points must be constrained in some way. Although the exact number is somewhat arbitrary, to a reasonable extent the more edge points that are constrained, the better. Similarly, it is preferable that internal edge points also be constrained. The external and any internal points must be constrained in such a manner as to allow the edges to rotate about the constraining mechanism, therefore fixed, cantilevered edges would not be appropriate. The preferable mode of constrainment is by pinning or a similar mode of simple support.

Typically, when a finite element model is produced, each element represents a square of approximately one to two millimeters on a side. The number of elements making up the model varies according to the size of the object being modeled. An average extrusion is typically no larger than one to two inches in diameter. When constraining the edges of the finite element model by pinning, the normal method is to pin the corner of each element which falls on an edge of the model. The number of edge points to be pinned therefore varies with the size of the extrusion, as well as with the size of the individual elements. The size of the finite elements is selected to be sufficiently small so that the resulting stress or deflection falls within the accuracy required. An exact solution may be obtainable for a simple circular shape but may not be obtainable for a complicated geometry, therefore the programmer must make a judgement as to how close to perfect accuracy is necessary. One approach for defining the required number of elements is to program the product using an initial number (e.g. 500) to obtain a first result, then to re-program with an increased number of elements (e.g. 1000) and check whether the solution has changed appreciably. When a satisfactory level of accuracy has been reached, the number of elements has been defined, and therefore the intersections with the edges of the model (i.e. the pinned edge points) can be specified. A circular section with a diameter of 11 mm may have approximately forty pinned edge points, or one pinned point every millimeter or less around its perimeter.

After the plate model has been defined, and the simulated pressure applied, the software program is executed to compare the position of the edges of the pressurized plate against the edge positions of the non-pressurized plate, thus providing a plot of the deflection of the edges of the plate under pressure. FIG. 1 provides a three-dimensional visualization of this comparison, as well as illustrating the geometric behavior of a polymeric fluid as it exits an extrusion die. The view of the pressurized plate 1 depicts the membrane (plate) deformed under pressure. The view of plate 2 illustrates the membrane under no pressure, e.g. after the fluid has left the die, resulting in uniform ambient pressure on all faces.

Under pressure, the membrane edges 3 rotate about the pinned (constrained) edge 4. The modeled plate is located such that its upstream face 5 is co-planar with the exit face of the extrusion die 6 (where the pressure is applied). The pinned edge 4 of the plate is at the downstream face of the plate, therefore the center of rotation is approximately ten percent of the major profile dimension downstream from the origin of the deflected edges. The pressure on the plate, and the resulting rotation about the pinned edges 4, causes the rotated edges 3 to move inwardly. According to the analogy upon which the subject invention is based, the amplitude of the inward deflection is proportional (by a multiplication factor) to the predicted die swell for the material to be extruded.

Figure 2:
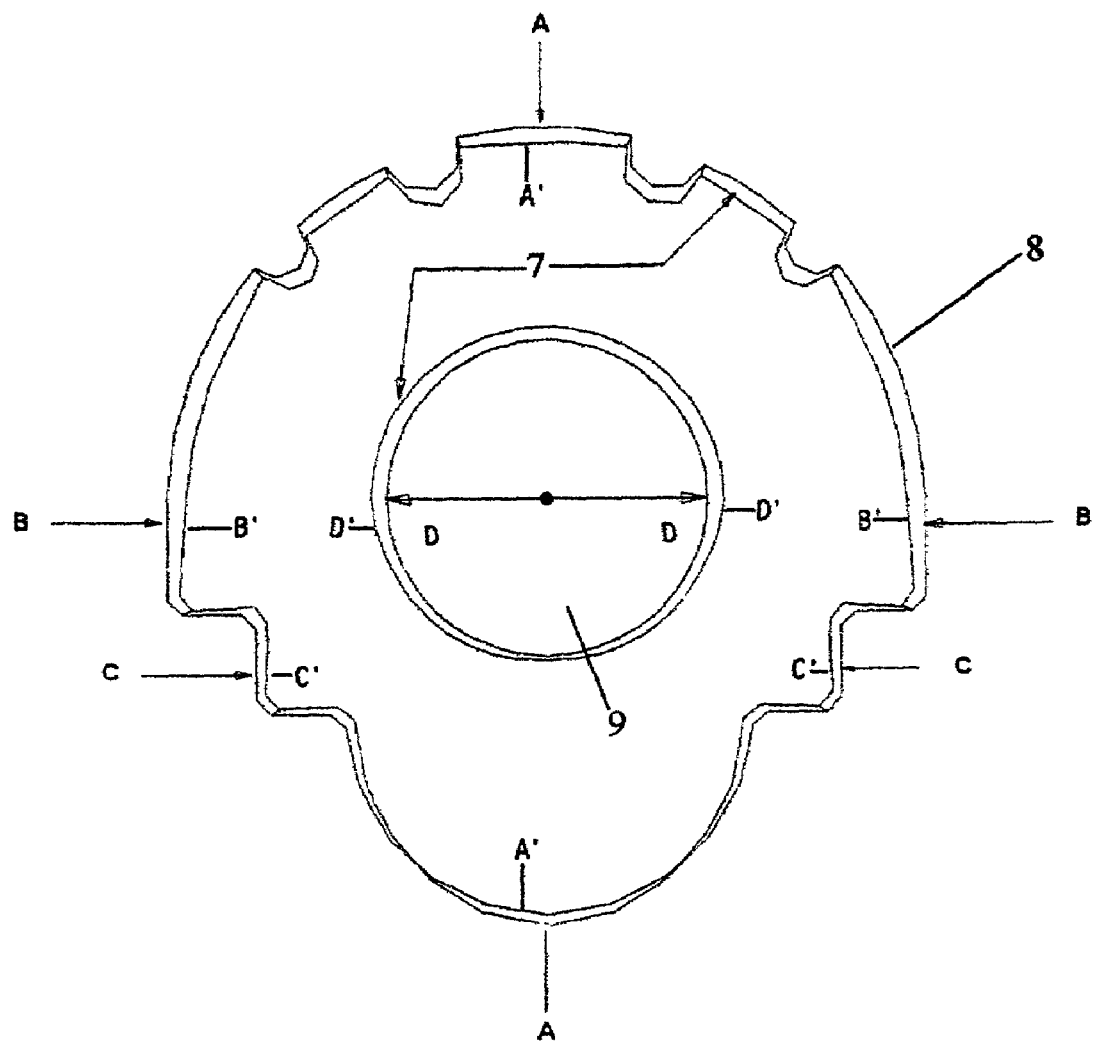
FIG. 2 is a schematic diagram depicting one embodiment of a comparison between a desired extruded product geometry and a deflected edge profile of a pressurized finite element plate model.

FIG. 2 provides an illustration of the die profile 7 resulting from the pressurized plate, in comparison with the unpressurized profile 8 of the desired product. For example, the desired dimension may be BB, but due to die swell, an extruded product will exit the die with larger dimensions than desired. Therefore, the die dimension for BB must be made smaller to accommodate the predicted swelling. In the case of the hole 9 of diameter DD, dimension DD is the desired size, but the die must have a larger hole than the desired extruded geometry, to allow for the extrudate contraction (due to its circumferential pressure on the circular male die).

To calculate the multiplication factor applied to determine the corrected die profile dimensions, a reference measurement from the plate model is used, in conjunction with known data taken from similar products extruded from the same rubber or plastic material on the specific extruder machine, and for the same operating conditions to be used for the new product. The reference measurement should be a major dimension of the profile. For example, in FIG. 2 a reference measurement of BB may be selected. Dimension BB represents the major dimension in the horizontal direction for the desired extruded geometry. Suppose it is known that for the specific rubber and extrusion machine under certain operating conditions that a simple circular extrusion will produce a die swell of thirteen percent. This die swell value will be used in the multiplication factor calculation. If die swell data is unknown for the particular material and machine being used, then a simple circular die may be fabricated and tested using the same material and extrusion machine in order to obtain this information. Die swell is calculated as $DS=(ED-PD)/PD$, where ED is the extruded dimension and PD is the profile dimension. If ED for a simple circular test extrusion is 26 mm and PD is 23 mm, then the reference die swell is $(26-23)/23=0.13$, or 13%.

In order to calculate the multiplication factor, knowledge of the reference die swell is applied to the model plate at a reference major dimension. In FIG. 2, the dimension BB provides the major dimension of the unpressurized plate (and of the desired extrusion), and B'B' is the dimension of the deflected model plate edges (and of the die profile as predicted by the software program, before application of the multiplication factor). Assuming, as above, that known data predicts an expected die swell of 13%, the expected die swell value is applied to the model at reference dimension BB. To solve for the multiplication factor, F, the percent deflection of the membrane edges at BB is forced to be equal to the expected die swell DS (e.g. 13%). For reference dimension BB, F is calculated by setting DS equal to $F(BB-B'B')/B'B'$. Solving for F, if BB=27 mm, B'B'=23 mm, and DS=13% (or 0.13), then F (the multiplication factor) is equal to 0.75.

The multiplication factor is then applied to the entire plate at several edge locations. For each dimension, the deflection predicted by the finite element analysis is adjusted by the multiplication factor. For example, if the desired dimension at CC=19 mm, and the deflected edge dimension (i.e. the profile as predicted by the software program) is C'C'=15.6, then the difference between desired and predicted is $(19-15.6)=3.4$ mm. Multiplying 3.4 mm by the multiplication factor of 0.75 provides $(3.4 mm)(0.75)=2.6$ mm, which is the corrected difference between the two dimensions. Finding the new (and corrected) value for C'C' requires subtracting the corrected difference (2.6 mm) from the desired product dimension (19 mm). The corrected value for C'C' then becomes $(19-2.6)=16.4$ mm, which is the required dimension for the profile at the CC location.

Calculating the required profile dimension for a hole in the desired product (e.g. the inside diameter of a hose) is similar, but requires an understanding that the hole diameter in the extruded product will decrease as a result of die swell, not increase as described above. In FIG. 2 the desired hole 9 has a diameter DD, and the software analysis (i.e. deflected edges of the hole) provides a predicted profile dimension D'D'. Assume that DD=11 mm, D'D'=113.6 mm, and the multiplication factor is still 0.75. The software-predicted difference between DD and D'D' is $11-13.6)=-2.6$ mm before application of the multiplication factor. Applying the multiplication factor provides $(-2.6 mm)(0.75)=-1.95$ mm, which is the corrected difference between the desired product hole size and the required profile dimension. The profile hole diameter must therefore be $(11 mm+1.95 mm)=12.95$, or approximately 13 mm.

When calculating the corrected dimensions (and thereby the required profile dimensions) according to the present invention, it is only necessary to provide corrections for a small number of locations around the perimeter of the die profile. For example in FIG. 2, corrected dimensions at AA, BB, CC, and DD may be sufficient to provide enough information to an experienced die designer to allow the fabrication of a satisfactory die. Generally, four to six dimensions may be adequate, and those dimensions may be calculated by hand, as in the example above. A suitable die for the required product may then be fabricated.

For an improved result, a computer can be further utilized to provide mathematical assistance for calculation of a larger number of profile dimensions. In fact, software might be utilized to calculate corrected dimensions around the entire profile at small incremental locations in order to determine very precise dimensions for the required die profile. For both improved accuracy and time savings, a computer might be utilized to not only construct and pressurize the finite element plate model, but also to make such calculations as the deflections of the pressurized profile edges, the multiplication factor, the corrected edge deflections, and the final profile die geometry.

A further improvement entails the utilization of a numerically controlled milling machine, which can calculate the required dimensions of the die profile, then produce the part ready for installation in the extrusion machine. Likewise, an electron discharge machine (EDM), or even more specifically a wire EDM machine, can be employed to receive the final profile die geometry and remove material from a production blank in order to manufacture the die hardware. Certainly, a variety of other improvements may be suggested by one practiced in the art and understanding the nature of the present invention, resulting in further time and cost savings and improvements in precision.

Introduction to Theory Supporting the Subject Invention

To supplement the description of the preferred embodiment of the subject invention, a discussion of the theory developed by the applicant in support of the invention is believed appropriate.

Die Inlet Flow

Figure 3:
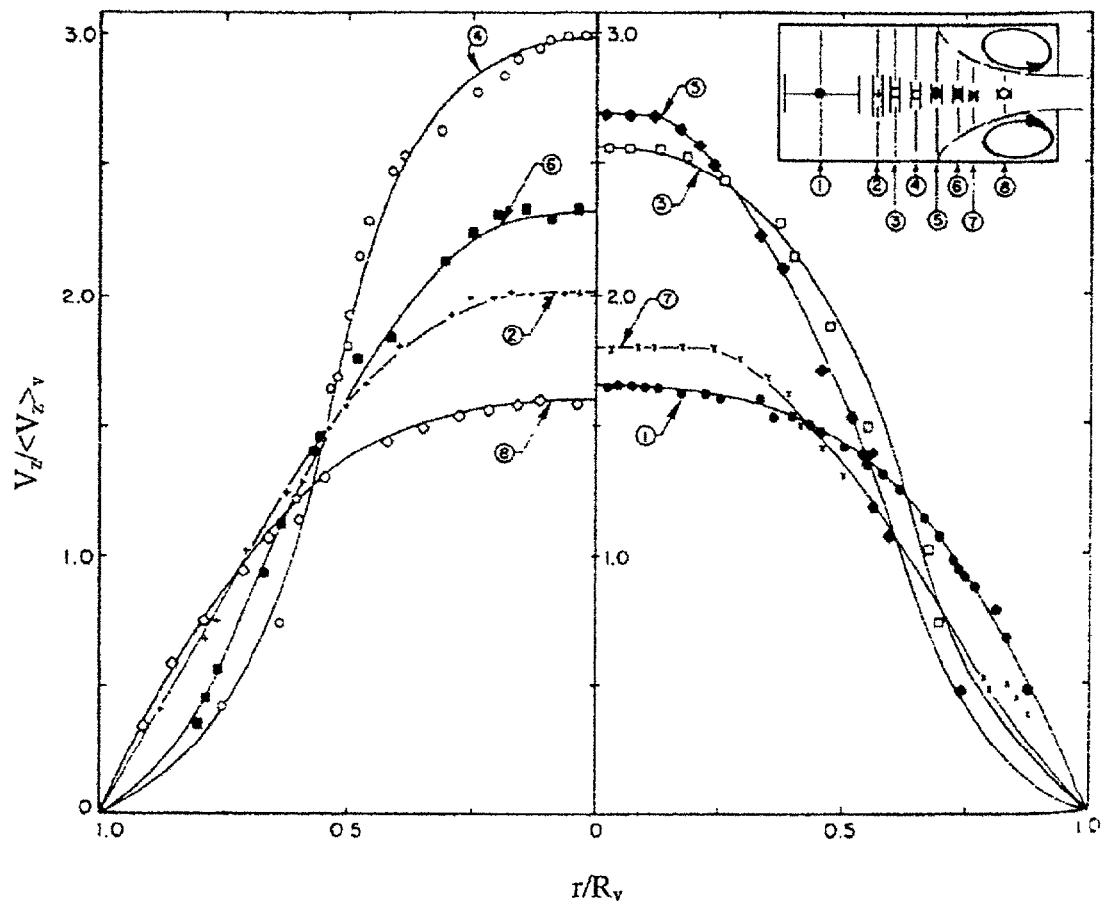
FIG. 3 is a plot showing an example of an axial profile in an entry region of a 4:1 contraction for a fluid.
Figure 4:
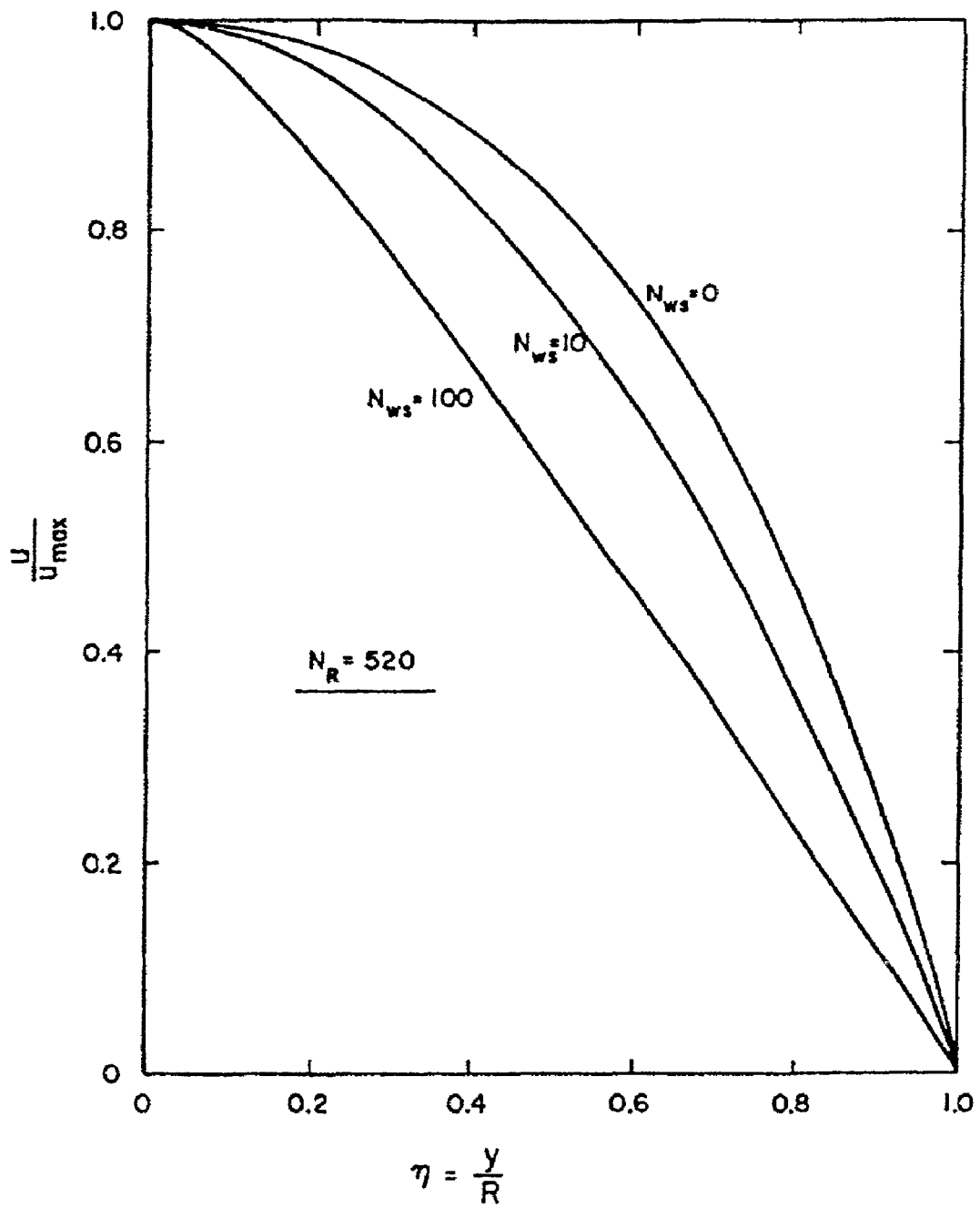
FIG. 4 is a plot showing an example of an axial profile in a ten-degree convergent channel.

Steady incompressible flow of a polymeric fluid near the entrance to a profile die is similar to flow at a sudden contraction. Concerning the latter case, A. H. P. Skelland observes in *Non-Newtonian Flow and Heat Transfer* (John Wiley, 1967), that "the pressure losses in all cases (laminar flow of polymeric fluids through sudden contractions) were very similar to those obtained with Newtonian fluids." Also, D. W. Dodge and A. B. Metzner agree with this observation (see *Turbulent Flow of Non-Newtonian Systems*, A. I. Ch. E. Journal, 5, 1959, pp. 189–204). For a similar problem, P. J. Cable and D. V. Boger measured the velocity profile shown in FIG. 3 (*A Comprehensive Experimental Investigation of Tubular Entry Flow of Viscoelastic Fluids: Part II The Velocity Filed in Stable Flow*, A. I. Ch. E. Journal, 24, 1978, pp. 992–999). This figure shows the profile as fully developed upstream by 2–3 diameters with a power law exponent of 0.367 (note: fluid V3=F7, $N_W$=0.39, see Cable, P. J., and Boger, D. V., *A Comprehensive Experimental Investigation of Tubular Entry Flow of Viscoelastic Fluids: Part I Vortex Characteristics in Stable Flow*, A. I. Ch. E. Journal, 24, 1978, pp. 869–879). As the fluid accelerates in the wine stem region formed by a corner vortex, the power law exponent becomes n>1. At the last profile, before the orifice, the fluid velocity profile returns to the fully developed profile. FIG. 4 (from Balmer, R. T., and Kauzlarich, J. J., *Similarity Solutions for the Converging or Diverging Steady Flow of Non-Newtonian Elastic Power Law Fluids with Wall Suction or Injection*, A. I. Ch. E. Journal, 17, 1971, pp. 1181–1187) is a plot of velocity profiles in a convergent channel predicting that the profile for a polymeric fluid with a non-zero Weisenberg number will have a power law exponent n>1. The profiles in FIG. 3 show that the fluid adheres to the wall and that the fluid leaving the orifice has a well-developed velocity profile; important when considering the velocity gradient at the flat plate die later.

Figure 5:
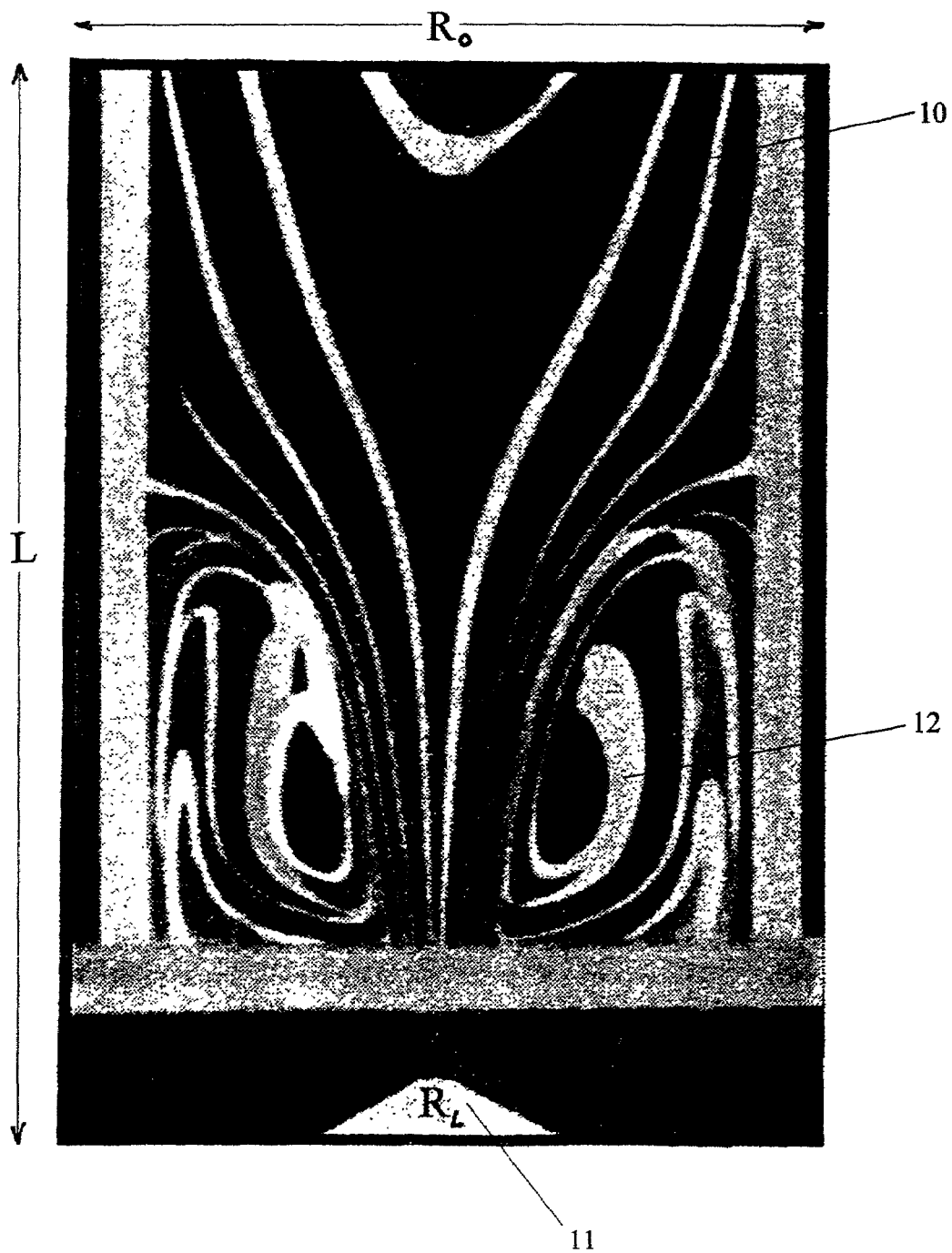
FIG. 5 is a flow visualization photograph taken through a glass-walled tube, of a die-impregnated polymer flow, showing an example of a set of streamlines for flow of a polymeric fluid at an inlet to a flat plate orifice.

FIG. 5 shows the streamlines 10 for flow of a polymeric fluid at the inlet to a flat plate orifice 11 from Bagley and Birks (*Flow of Polyethylene into a Capillary*, Journal of Applied Physics, 31, 1960, pp. 556–561). Clearly there is a vortex 12 encircling the flow in the corner before the sudden contraction which appears to force the fluid to flow along streamlines that are often called a wine glass stem funnel. If the radius of the orifice is $R_L$ and upstream from the upper end of the vortex is designated $R_0$ with a distance L between, it is obvious that $R_L<<L$. This observation constitutes the condition that flow in a straight tube can be applied locally to flow in a tapered tube, as demonstrated by Bird, Armstrong, and Hassager in *Dynamics of Polymeric Liquids* (Volume 1, Wiley, 1987), equation 1.3–29, p. 17. Here we see that the fluid mechanics at the die can be approximated by laminar flow in a conduit, neglecting the acceleration of the fluid before the die.

Analogy

The theoretical basis between steady two-dimensional flow in a conduit and plate mechanics was initially described by Rayleigh in 1893 (*On the Flow of Liquids*, Scientific Papers, Vol. IV, Cambridge University Press, 1903, pp. 78–93), and later by Lamb (see above Hydrodynamics, p. 608). More recently, Yih discussed the issues involved under the title of "The Soap Bubble Analogy" (*Fluid Mechanics*, McGraw-Hill, 1969). Yih finds that unidirectional flow in a conduit of any cross section is governed by the Poisson equation, and the governing equation for a soap film in two dimensions is also the Poisson equation. In Theory and Analysis of Plates (Prentice Hall, 1974) Szilard discusses membranes and various analogies, and shows that the equation governing the membrane is simply the differential equation of Poisson's type.

Rouse (*Advanced Fluid Mechanics*, John Wiley, 1959) lists the equation for steady flow in a conduit of arbitrary cross section, which is the Poisson equation, and finds the equation governing a membrane is analogous. From membrane mechanics, Poisson's equation is derived as, $$\frac{\partial^2 w}{\partial x^2} + \frac{\partial^2 w}{\partial y^2} = \frac{1}{T}\frac{\partial p}{\partial z} \quad (1)$$

where w is the membrane deflection, p is pressure, and T is the membrane tension. For two-dimensional, steady, incompressible conduit fluid mechanics, Poisson's equation in the same coordinate system as Eq. 1, assuming the apparent viscosity is constant, can be written as, $$\frac{\partial^2 u}{\partial x^2} + \frac{\partial^2 u}{\partial y^2} = \frac{1}{\eta}\frac{\partial p}{\partial z} \quad (2)$$

where u is the fluid velocity, p is pressure, and $\eta$ is the apparent viscosity of the fluid. By this analogy it is expected that the velocity profile at the exit to a flat plate die will be similar to the deflection profile of a membrane pinned along the die profile curve. The fluid flowing into the die and the membrane are both under a uniform pressure.

Analogy Applied

A flat plate (membrane) simply constrained at the edges is dished by pressure, and the slope of the flat plate at the constrained edges is analogous to the slope of the velocity of the extrudate at the die wall exit. This maximum velocity gradient in the flow from the exit of the die is proportional to the die swell, discussed later. The flat plate reflects the die swell or contraction experienced by the extrudate. Since the edges of the flat plate will be rotated in proportion to the deflection gradient at the edges, the flat plate under pressure reflects the required die shape needed to offset die swell in a polymer extruder.

Referring back, FIG. 1 is a schematic diagram which shows the analogy applied to the extrusion process. Beyond the exit to the die the extrudate moves at constant velocity in the absence of pressure forces. This example uses the analogy of a flat plate membrane in the shape of a square. The die swell is indicated by the difference between the die shape of the plate and the original shape of the flat plate; which is the shape of the pinned edge.

Using a finite element computer program a flat plate model was developed in three dimensions as shown in FIG.

1. The flat plate is in the shape of the final, extrudate square shape desired. The plate is constrained (pinned) at the outer edges as noted, and a pressure load applied to the constrained surface. Since the plate should act like a membrane, the properties of a rubber were selected for the plate. In this example, the modulus of elasticity of the rubber is E=2 MPa, and Poisson's ration ν=0.49, where the plate is 20 mm square and 2 mm thick, with an applied pressure of 0.1 Mpa. Since post-processing of the view of the plate deformation can be controlled, and the deformation is linear with respect to pressure, re-analysis of the plate at a different pressure to predict die swell is not required.

Because there are so many variables that effect the die swell from an extruder, it is convenient to assume a reference die swell for a major dimension of the model based on practical experience with the given extruder and extrudate composition.

Die Swell

In 1970 Tanner published a theory of die swell that has been referenced consistently since that time (see Tanner, R. I., *A Theory of Die Swell*, Journal of Polymer Science: Part A-2, 8, 1970, pp. 2067–2078). His theory was based on sudden recovery of stored energy. Bird, et al. (see Bird, Armstrong, and Hassager above, p. 73) give the Tanner equation as, $$B = 0.1 + \left[1 + \frac{1}{2}\left(\frac{\tau_{11} - \tau_{22}}{2\tau_{21}}\right)_w^2\right]^{1/6} \quad (3)$$

where B is the die swell, τ is shear stress in the membrane, and w is the wall of the die.

Tanner also finds that material with a single time constant will have $$\frac{\tau_{11} - \tau_{22}}{2\tau_{21}} = \frac{\tau_{21}}{G} \quad (4)$$

where G is a constant and $\tau_{21}/G$ is the recoverable shear. Thus, $$B \approx \tau_{21}^{1/3} \quad (5)$$

Consider a profile die with a wine glass stem funnel entrance flow of a polymeric fluid. In the section on die inlet flow, it was this flow that exhibits a velocity profile with a power law exponent greater than 1; for mathematical simplicity choose n=3, then Equation (5) becomes $$B \approx \dot{\gamma} \quad (6)$$

where $\dot{\gamma}$ is the velocity gradient and B is die swell.

Pearson and Trottnow (*On Die Swell: Some Theoretical Results*, Journal of Non-Newtonian Fluid Mechanics, 4, 1978, pp. 195–215) develop the equations for die swell, considering a short and a long capillary model by including sink flow at the entrance to the capillary, and find that for large $\Lambda = 4\bar{u}\lambda/D$ with short or long capillaries, $$B = \Lambda^{1/3} \quad (7)$$

which agrees with Equation (5), by making use of the Rabiowitsch-Moony equation (see Skelland above, p. 31). In Equation (7), u is the flow velocity, λ is the relaxation time for the fluid, D is the capillary diameter. A is the Weissenberg number for capillary flow.

Brandao, Spieth, and Lekakou (*Extrusion of Polypropylene. Part I: Melt Rheology*, Polymer Engineering and Science, 36, 1996, pp. 49–55) present an approach to modeling die swell in circular dies in which the first normal stress difference ($N_1$) and the shear stress (τ) are related by an empirically determined power law equation of the following form:

$$N_1 = \tau_{11} - \tau_{22} = A\tau_{12}^a \quad (8)$$

in which A is the cross sectional area of the circular die. They then get an equation based on Tanner's theory where $$B \approx \tau_w^{a/3} \quad (9)$$

in agreement with Equation (5), if a=1. For 2 polypropylene grades they get a value of "a" near 1.

Die Design for a Tire

Figure 6:
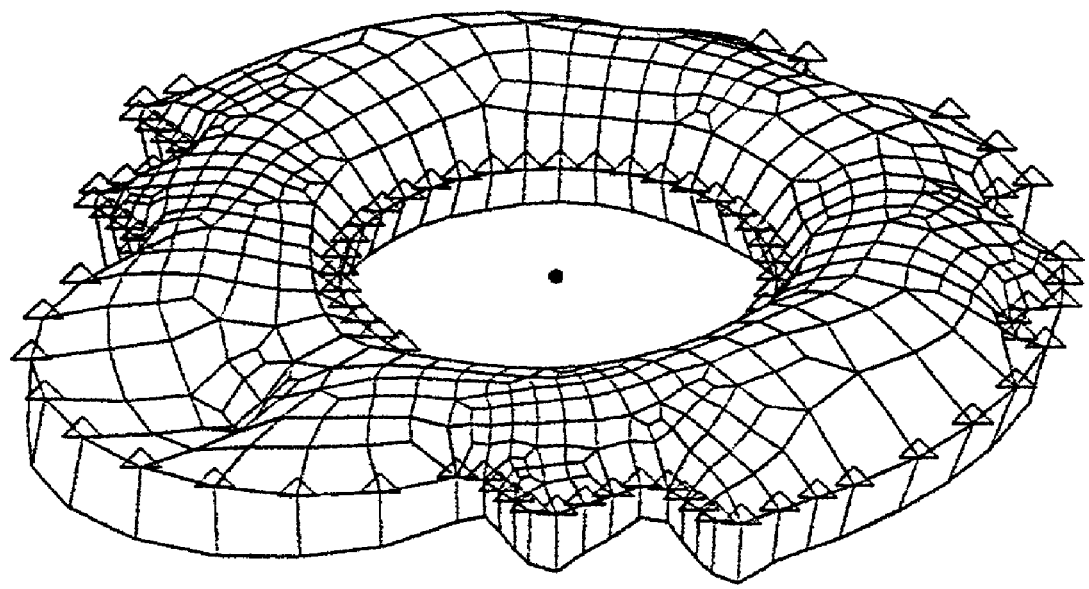
FIG. 6 is a three dimensional depiction of one embodiment of a finite element model of a rubber membrane pressurized for determining a tire die design.

The present invention has been tested successfully by application to a wheelchair tire extrusion process. The design of a patented tire for wheelchairs calls for extrusion using a natural rubber with 39% solids (see Kauzlarich, J. J., and Metherell, C., Maintenance-Free Vehicle and Cart Tire, U.S. Pat. No. 5,090,464, Feb. 25, 1992). The result of designing the die using the membrane analogy is shown in FIG. 6, under pressure. The upper edges 13 of the desired shape are pinned, and the major diameter across the tire is 26 mm with an 11 mm hole. The membrane thickness was 2 mm for this example. The rubber modulus of elasticity E=2 MPa and Poisson's ratio was ν=0.49. A pressure of 0.1 MPa was applied to the surface of the membrane.

Measurements of the cured tire were supplied by Stuart Lee (Private Communication, Lee-Healey Co. LTD, Femie Road, Market Harborough LE16 7PP, UK, May 31, 1996), and are for room temperature. The dimensions at BB were chosen as a reference die swell of 13% as shown in FIG. 2. Recall that FIG. 2 illustrates the predicted die profile plus the desired extrusion profile, and was obtained from FIG. 6 of the finite element analysis by entering View and Select in the FE program to plot only the free edges of the membrane. A comparison of the die swell shown in FIG. 2 by scaling from the reference condition gave very good results between the predicted and measured die swell and contraction. Note the hole contraction from the die dimension. The small thermal contraction on the order of 0.015% for the tire dimensions after the cure is included in the die swell measurements.

The minor loss coefficient of a Newtonian fluid across a sudden contraction is inversely proportional to the area ratio, as described by Fox and McDonald (*Introduction to Fluid Mechanics*, 5th Ed., Wiley, 1998, p. 363). Since die swell is proportional to fluid losses, it will also obey a similar relation, and this fact can be used to control the die swell. Placing a sleeve in the barrel of the extruder upstream from the die will affect the resulting die swell. The data shown in FIG. 2 was for an area ratio of 0.62 at BB. In another run with a different sleeve, where the area ratio equaled 0.42 at BB, the die swell increased to 19.7%.

Conclusion—Method for Designing a Profile Die for Polymer Extrusion

According to the subject invention, an analogy for predicting the shape of a flat plate die to correct for die swell makes use of a pressure loaded, pinned membrane in the shape of the desired extrudate cross section. It is assumed that the flow is isothermal, and the die swell is proportional to the die-wall velocity gradient. A three dimensional solid rubber membrane is constructed using finite elements in the shape of the desired profile. Under a pressure load the deflection of the unconstrained edge of the membrane is proportional to the deflection gradient at the wall and by the analogy also proportional to the velocity gradient of the flow.

An application has been successfully demonstrated for the design of a flat plate die to produce a natural rubber tire. Using a reference die swell at one point on the die it is possible to predict the die swell at other points on the die. The experimental and theoretical results for the tire are in very good agreement.

Although the analogy has only been tested with a natural rubber mix, it provides a good relative indication of die swell from a flat plate die, and therefore should be applicable to other materials, such as other rubbers and polymers. It is expected that good results with the analogy will depend on the die profile; which in FIG. 2 is basically symmetrical. An 'L' shape would not be expected to give good results because the entrance flow conditions probably would produce a very un-symmetrical vortex. In addition, a sleeve in the barrel of the extruder upstream from the die can control the die swell. A sleeve nearly equal to the profile of the die as possible gives the lowest die swell.

Although this invention has been described in its preferred form with a certain degree of particularity, it is understood that the present disclosure of the preferred embodiment has been made only by way of example, and that numerous changes in the details of the method, and in the combination and arrangement of process steps, may be resorted to without departing from the spirit and the scope of the invention as hereinafter claimed.

The invention claimed is:

1. A numerically controlled machine for converting a desired extrusion profile geometry to a manufactured profile extrusion die, comprising:

Means for inputting a cross-sectional profile geometry for a desired extrusion, the profile geometry having at least one external edge and at least one major cross-sectional diameter;

Means for constructing a finite element plate model with the cross-sectional profile geometry, a thickness of approximately ten percent of the major cross-sectional diameter, mechanical properties of a rubber material, and a plurality of edge points;

Means for constraining the finite element plate model by pinning at the edge points;

Means for creating a pressurized finite element plate model by applying pressure to a side of the finite element plate model to deflect a surface of the finite element plate model by no more than the thickness of the finite element plate model;

Means for creating a measured edge deflection by measuring a deflection of at least one edge of the pressurized finite element plate model;

Means for calculating a multiplication factor F, based on a calculated extrudate die swell value DS, said multiplication factor, F, to be used for scaling at least one measured edge deflection;

Means for calculating at least one corrected edge deflection by applying the multiplication factor, F, to a measured edge deflection;

Means for creating a final profile geometry, by repeating the step of calculating at least one corrected edge deflection until a die profile shape is defined; and Means for removing material from a production blank to produce a manufactured profile die according to the defined die profile shape.

2. A numerically controlled machine for converting a desired extrusion profile geometry to a manufactured profile extrusion die according to claim 1, wherein the numerically controlled machine is a milling machine.

3. A numerically controlled machine for converting a desired extrusion profile geometry to a manufactured profile extrusion die according to claim 1, wherein the numerically controlled machine is an electron discharge machine.

4. A numerically controlled machine for converting a desired extrusion profile geometry to a manufactured profile extrusion die according to claim 3, wherein the electron discharge machine is a wire electron discharge machine.

5. An electronic control system for converting a desired cross-sectional profile geometry to a final profile die geometry, comprising:

Means for inputting a cross-sectional profile geometry for a desired extrusion, the profile geometry having at least one external edge and at least one major cross-sectional diameter;

Means for constructing a finite element plate model with the cross-sectional profile geometry, a thickness of approximately ten percent of the major cross-sectional diameter, mechanical properties of a rubber material, and a plurality of edge points;

Means for constraining the finite element plate model by pinning thereof at the edge points;

Means for creating a pressurized finite element plate model by applying pressure to a side of the finite element plate model to deflect a surface of the finite element plate model by no more than the thickness of the finite element plate model;

Means for creating a measured edge deflection by measuring a deflection of at least one edge of the pressurized finite element plate model;

Means for calculating a multiplication factor F, based on a calculated extrudate die swell value DS, said multiplication factor, F, to be used for scaling at least one measured edge deflection;

Means for calculating at least one corrected edge deflection by applying the multiplication factor, F, to a measured edge deflection; and Means for creating a final profile die geometry, by repeating the step of calculating at least one corrected edge deflection until a die profile shape is defined.

* * * * *